United States Patent Office 3,117,111
Patented Jan. 7, 1964

3,117,111
PROCESS FOR PRODUCING LINEAR HIGH POLYMERS OF ACRYLONITRILE USING CO-CATALYST OF METAL ALKYL WITH METAL ALCOHOLATE OR ACETYLACE-TONATE
Giulio Natta and Gino Dall'Asta, Milan, Italy, assignors to Montecatini Societa Generale per l'Industria Mineraria e Chimica, Milan, Italy
No Drawing. Filed Oct. 3, 1957, Ser. No. 687,861
Claims priority, application Italy Oct. 4, 1956
11 Claims. (Cl. 260—88.7)

This invention relates to a new and improved process for polymerizing acrylonitrile.

The polymerization of acrylonitrile is usually carried out in aqueous solution with the aid of catalysts which act with a free radical mechanism, e.g., initiators such as peroxides and persulfates, or in a redox system, i.e., a system utilizing peroxide-type initiators in the presence of a reducing agent. To avoid chain branching due to chain transfer to polymer at high conversions, the polymerization is usually carried to low conversions and a continuous process is required when it is desired to produce the polyacrylonitrile in commercial amounts.

It has also been proposed to polymerize acrylonitrile by anionic processes, using catalysts of the type of sodium amide. However, that method has met with little success.

An object of this invention is to provide a new process for polymerizing acrylonitrile using catalysts which are new aids for such polymerization and which has advantages over the known methods for producing polyacrylonitrile.

The objects of this invention are accomplished by polymerizing the acrylonitrile with the aid of a catalyst prepared from an organometallic compound of the 1st to 3rd groups of the periodic table and certain compounds of transition metals of groups IV to VI of the periodic table.

Recently one of us, G. Natta, has shown that hydrocarbons of the type $CH_2=CHR$, where R is an alkyl or aryl radical, can be polymerized to new polymers having a particular structure with the aid of catalysts prepared from organometallic compounds of metals of the 1st, 2nd and 3rd groups of the Mendeleeff Periodic Table and compounds of transition metals of Groups IV to VI of said Periodic Table.

The organometallic compounds used in preparing those catalysts and particularly those derived from aluminum, zinc, magnesium and lithium are highly active toward compounds which contain mobile hydrogen (such as alcohols, primary and secondary amines, carboxylic acids and so on), and toward compounds containing functional groups comprising double or triple bonds (such as ketones, aldehydes, esters, nitriles, etc.). Moreover, where the organometallic compounds of the mentioned metals are heated they decompose with a mechanism which results in the formation of an olefine and a metal hydride. The behaviour of those compounds on thermal decomposition is therefor different from that of organic compounds of metals and metalloids of the 4th and 5th groups of the periodic table (lead, phosphorus, antimony, bismuth) and of organic compounds of the transition metals which, on thermal decomposition, yield free radicals.

It was known that the organometallic compounds which, on thermal decomposition, yield free radicals are capable of promoting the polymerization of vinyl monomers with a radical mechanism.

The catalysts used in accordance with this invention for the polymerization of acrylonitrile and derived from the organometallic compounds of the metals of the 1st to 3rd groups of the table function, on the other hand, with a polyaddition mechanism (organometallic synthesis) to which we attribute a particular nature of anionic type (see Chimica e Industria 38, 1935; 1956).

This type of catalyst has only been found useful heretofore as aid for the polymerization of hydrocarbon monomers like propylene, i.e., monomers which do not contain functional groups capable of reacting with the organometallic compound of the groups I to III metals.

Since acrylonitrile contains the $C \equiv N$ group, and the organometallic compounds of the metals of the 1st to 3rd groups of the periodic table are normally highly active toward such functional groups, it could have been expected that the catalyst prepared from such organometallic compounds would react with the monomer, thus being inactivated as a promoter of the polymerization.

Surprisingly, we find that the catalysts prepared from compounds of metals of the 1st to 3rd groups of the Mendeleeff Periodic Table and compounds of the transition metals in which the metal is bonded to organic groups by oxygen atoms, are very effective promotors of the polymerization of acrylonitrile to high polymers. Such catalysts are prepared, for example, from alkyl or aryl compounds of aluminum or zinc and alcoholates or acetylacetonates of the transition metals titanium, vanadium and chromium.

It is surprising that the catalysts prepared from the alcoholates and acetylacetonates of the transition metals are effective catalysts for the acrylonitrile polymerization because those catalysts are considerably less effective promotors of the polymerizations of the hydrocarbons $CH_2=CHR$ than catalysts prepared from the organometallic compounds and such transition metal compounds as $TiCl_4$, $TiCl_3$, $VCl_4$, $VCl_3$, etc.

The polymerization of acrylonitrile using the catalysts in accordance with this invention can be carried out by either bulk or solution processes, in an inert, oxygen and moisture-free atmosphere and at temperatures between 0° C. and 100° C., more specifically between 40° C. and 80° C. If solution polymerization is used, the solvent may be a hydrocarbon solvent which is inert to the catalyst but dissolves the monomer, such as an aromatic hydrocarbon of the type of benzene or toluene, or a solvent for the polymer, including dimethylformamide and dimethylacetamide. In either case, the solvent selected must be one which does not react with the organometallic compound used in preparing the catalyst.

Since the polyacrylonitrile is insoluble in the monomer it is necessary, when the polymerization is effected in the absence of a solvent for the polymer, to carry out the polymerization in an apparatus provided with a very efficient stirring system, in order to reduce the possibility for occlusion of the catalyst with the polymer.

In the organometallic compound, the valencies of the metal may be satisfied by the same or different alkyl or aryl radicals containing from 1 to 12 carbon atoms.

In the transition metal alcoholates, which are represented by the formula $M(OR)_n$, or $MO(OR)_n$, M being the transition metal, —OR may be derived from an alcohol containing from 2 to 6 carbon atoms, and $n$ may have a value of from 2 to 4.

The following examples are given to illustrate specific embodiments of the invention, it being understood that these examples are not intended as limitative.

*Example 1*

Into a rotating autoclave having a capacity of approximately 2.0 liters and capable of functioning as a ball mill, there were introduced 10 stainless steel balls having a diameter of 1.0 inch, 0.03 mol of chromium acetyleacetonate, and 50 ccs. of of anhydrous toluene. A solution of 0.09 mol of dibutyl zinc in 50 ccs. of anhydrous toluene was added, nitrogen was introduced under a slight pressure, and the mass was heated to 75° C. with continued stirring. After rotating the autoclave for about 30 minutes, 3 mols of anhydrous acrylonitrile were introduced under a slight vacuum. The autoclave was rotated at 75° C. for about 30 hours and the reaction product, which was a compact brown-red mass, was discharged. The polyacrylonitrile was purified by treating the mass with alcohol (methanol or butanol) diluted with hydrochloric acid. The mass was filtered to remove the inorganic residue entrained in the acidified alcohol. The residue of the filtration was washed with methanol and dried by heating in vacuum. A yield of 150 g. of polyacrylonitrile having a slightly yellowish white color was obtained.

The polymer can be further purified by dissolving it in, for instance, dimethylformamide, followed by coagulation with acetone or methanol, which treatment removes the last traces of the inorganic residues.

*Example 2*

Into apparatus as described in Example 1, there were introduced, under nitrogen, 0.03 mol of chromium acetylacetonate and 100 ccs. of benzene. A solution of 0.09 mol of diethyl zinc in 100 ccs. of benzene was then introduced.

The autoclave was rotated at 70° C. for about 30 minutes. The temperature was allowed to drop to 45° C., and 3 mols of acrylonitrile were added. By rotating the autoclave for an additional 60 hours, and then discharging the reaction product and purifying the polymer as in Example 1, 90 g. of polyacrylonitrile in the form of a white powder were obtained.

*Example 3*

Apparatus as described in Example 1 was used. 0.03 mol of chromium acetylacetonate in 50 ccs. of benzene and a solution of 0.09 mol of triethyl aluminum in 50 ccs. of benzene were introduced into the autoclave, which was heated to 75° C. and rotated at that temperature for about 30 minutes and then cooled to room temperature. 3.0 mols of crylonitrile were added and the autoclave was rotated for 60 hours, after which time the reaction product was discharged. Proceeding as in Example 1, 8 g. of polyacrylonitrile having a yellow color were obtained

*Example 4*

Into a rotating autoclave as in Example 1, there were introduced 0.01 mol. of triethoxy vanadyl and 50 ccs. of anhydrous toluene. A solution of 0.03 mol. of diethyl zinc in 50 ccs. of toluene was added. Nitrogen under a low pressure was introduced, and the mass was heated to 75° C., the autoclave being kept at that temperature for 30 minutes. One mol of acrylonitrile was introduced and rotation of the autoclave at 75° C. was continued for about 60 hours. The reaction product was discharged and worked up as in Example 1. Pure polyacrylonitrile (7 gms.) was obtained.

*Example 5*

Using an autoclave as in Example 1, 0.03 mol of chromium acetylacetonate and 25 ccs. of anhydrous benzene were introduced, followed by a solution of 0.09 mol. of dibutyl zinc in 20 ccs. of anhydrous benzene. The mixture was heated to 75° C., with agitation, maintained at 75° C. for about 30 minutes, and then cooled to 45° C. 3 mols of acrylonitrile and 200 ccs. of dimethylformamide were then introduced, and the autoclave was rotated for about 40 hours.

By coagulation with acetone and methanol, 150 gms. of polyacrylonitrile were isolated.

As will be apparent from the foregoing example, the yield of polyacrylonitrile obtained by the present method may be very high, the percent conversion based on the amount of monomer used being, in some instances, as high as 90—95%, and even at those high conversions the polyacrylonitrile obtained is essentially linear.

The molar ratio of the metal alkyl or aryl compound to the transition metal acetylacetonate or alcoholate used in preparing the catalyst may be varied. Suitable molar ratios are, for instance, 1:1 to 10:1.

The acrylonitrile polymers produced by the present method are essentially linear and are characterized in that sections of the chain have a syndiotactic configuration of the monomeric units.

The term "syndiotactic" has been used by one of us, G. Natta, to define polymers of a vinyl monomer R—CH=CH$_2$, consisting of regular head-to-tail sequences of monomeric units, in which each second tertiary carbon atom of the chain has the same steric configuration. The main chain of these polymers, when extended in a plane, shows the R groups alternating either above or below the plane of the main chain.

The process of this invention can be carried out continuously.

Since changes can be made in details in practicing the invention without departing from the spirit thereof, it is intended to include in the scope of the appended claims all such modifications as may be apparent to those skilled in the art.

What is claimed is:

1. A process for polymerizing acrylonitrile to linear high molecular weight homopolymers containing chain sections having a syndiotactic configuration of the monomeric units, which process comprises polymerizing acrylonitrile in contact with a catalyst consisting essentially of the product obtained by mixing an alkyl compound of a metal selected from the group consisting of aluminum and zinc and a compound of a transition metal selected from the groups consisting of alcoholates and acetylacetonates of titanium, vanadium and chromium.

2. A process for polymerizing acrylonitrile to linear high molecular weight homopolymers containing chain sections having a syndiotactic configuration of the monomeric units, which process comprises polymerizing acrylonitrile in contact with a catalyst consisting essentially of the product obtained by mixing an alkyl compound of a metal selected from the group consisting of aluminum and zinc and an alcoholate of a transition metal selected from the group consisting of titanium, vanadium and chromium.

3. A process for polymerizing acrylonitrile to linear high molecular weight homopolymers containing chain sections having a syndiotactic configuration of the monomeric units, which process comprises polymerizing acrylonitrile in contact with a catalyst consisting essentially of the product obtained by mixing an alkyl compound of a metal selected from the group consisting of aluminum and zinc, and an acetylacetonate of a transition metal selected from the group consisting of titanium, vanadium and chromium.

4. A process for polymerizing acrylonitrile to linear high molecular weight homopolymers containing chain sections having a syndiotactic configuration of the monomeric units, which process comprises polymerizing acrylonitrile in contact with a catalyst consisting essentially of the product obtained by mixing an alkyl compound of a metal selected from the group consisting of aluminum and zinc and an alcoholate of titanium.

5. A process for polymerizing acrylonitrile to linear high molecular weight homopolymers containing chain sections having a syndiotactic configuration of the monomeric units, which process comprises polymerizing acrylonitrile in contact with a catalyst consisting essentially of the product obtained by mixing an aluminum alkyl compound and a compound of a transition metal selected from the group consisting of alcoholates and acetylacetonates of titanium, vanadium and chromium.

6. A process for polymerizing acrylonitrile to linear high molecular weight homopolymers containing chain sections having a syndiotactic configuration of the monomeric units, which process comprises polymerizing acrylonitrile in contact with a catalyst consisting essentially of the product obtained by mixing a zinc alkyl compound and a compound of a transition metal selected from the group consisting of the alcoholates and acetylacetonates of titanium, vanadium, and chromium.

7. The process according to claim 1, characterized in that the polymerization of the acrylonitrile is carried out in the presence of a hydrocarbon solvent for the monomer, said solvent being chemically inert to the catalyst.

8. The process according to claim 1, characterized in that the polymerization of the acrylonitrile is carried out in the presence of a solvent for the polymer, said solvent being chemically inert to the catalyst.

9. The process according to claim 8, characterized in that the solvent for the polyacrylonitrile is dimethylformamide.

10. The process according to claim 8, characterized in that the solvent for the polyacrylonitrile is dimethylacetamide.

11. The process according to claim 1, characterized in that the acrylonitrile is polymerized at a temperature between 40° C. and 80° C.

References Cited in the file of this patent

UNITED STATES PATENTS

| | | | |
|---|---|---|---|
| 2,440,498 | Young et al. | Apr. 27, | 1948 |
| 2,511,480 | Roedel | June 13, | 1950 |
| 2,608,554 | Bullitt | Aug. 26, | 1952 |
| 2,608,555 | Bullitt | Aug. 26, | 1952 |
| 2,721,189 | Anderson et al. | Oct. 18, | 1955 |
| 2,762,790 | Greene | Sept. 11, | 1956 |
| 2,781,410 | Ziegler et al. | Feb. 12, | 1957 |
| 2,846,427 | Findlay | Aug. 5, | 1958 |
| 2,881,156 | Pilar et al. | Apr. 7, | 1959 |
| 2,882,264 | Barnes et al. | Apr. 14, | 1959 |
| 2,910,461 | Nowlin et al. | Oct. 27, | 1959 |
| 2,954,367 | Vandenberg | Sept. 27, | 1960 |

FOREIGN PATENTS

| | | | |
|---|---|---|---|
| 545,968 | Belgium | Sept. 10, | 1956 |
| 566,713 | Belgium | Apr. 30, | 1958 |

OTHER REFERENCES

Beaman: J. Am. Chem. Soc., 70, 3115–8 (1948).

Eirich et al.: J. of Colloid Sci., 11, 748–766 (page 764 relied on) (1956).